United States Patent [19]
Eida et al.

[11] Patent Number: 5,127,946
[45] Date of Patent: Jul. 7, 1992

[54] INK, AND INK-JET RECORDING METHOD AND APPARATUS EMPLOYING THE INK

[75] Inventors: Tsuyoshi Eida, Yokohama; Takao Yamamoto, Isehara; Mayumi Yamamoto, Tokyo, all of Japan

[73] Assignee: Canon Kabushiki Kaisha, Tokyo, Japan

[21] Appl. No.: 644,605

[22] Filed: Jan. 23, 1991

[30] Foreign Application Priority Data

Jan. 30, 1990 [JP] Japan .................................. 2-20097
Dec. 28, 1990 [JP] Japan .................................. 2-415359

[51] Int. Cl.$^5$ ............................................ C09D 11/02
[52] U.S. Cl. ..................................... 106/22; 534/680; 534/685; 534/687; 534/809; 534/810; 534/811; 534/812; 534/815
[58] Field of Search ................. 106/20, 22; 534/680, 534/685, 687, 810, 811, 812, 815, 809

[56] References Cited

U.S. PATENT DOCUMENTS

| | | | |
|---|---|---|---|
| 4,255,327 | 3/1981 | Brode | 534/836 |
| 4,373,954 | 2/1983 | Eida et al. | 106/22 |
| 4,395,288 | 7/1983 | Eida et al. | 106/22 |
| 4,426,226 | 1/1984 | Ohta et al. | 106/22 |
| 4,435,717 | 3/1984 | Eida et al. | 346/1.1 |
| 4,557,761 | 12/1985 | Kobayashi et al. | 106/22 |
| 4,620,876 | 11/1986 | Fujii et al. | 106/22 |
| 4,661,158 | 4/1987 | Kobayashi et al. | 106/22 |
| 4,732,613 | 3/1988 | Shioya et al. | 106/22 |
| 4,734,489 | 3/1988 | Kawasaki et al. | 106/22 |
| 4,765,838 | 8/1988 | Ohata et al. | 106/20 |
| 4,778,525 | 10/1988 | Kobayashi et al. | 106/20 |
| 4,804,411 | 2/1989 | Eida et al. | 106/22 |
| 4,841,037 | 6/1989 | Ohta et al. | 106/22 |
| 4,864,324 | 9/1989 | Shirota et al. | 346/1.1 |
| 5,017,227 | 5/1991 | Koike et al. | 106/22 |

FOREIGN PATENT DOCUMENTS

| | | |
|---|---|---|
| 3330379 | 2/1984 | Fed. Rep. of Germany . |
| 151070 | 11/1980 | Japan . |
| 56-57862 | 5/1981 | Japan . |
| 59-93766 | 5/1984 | Japan . |
| 59-93768 | 5/1984 | Japan . |
| 62-10274 | 3/1987 | Japan . |
| 135880 | 5/1989 | Japan . |
| 1135880 | 5/1989 | Japan . |
| 1193375 | 8/1989 | Japan . |
| 2108518 | 5/1983 | United Kingdom . |

Primary Examiner—William R. Dixon, Jr.
Assistant Examiner—Helene Klemanski
Attorney, Agent, or Firm—Fitzpatrick, Cella, Harper & Scinto

[57] ABSTRACT

Provided is an ink containing a recording agent and a liquid medium for dissolution or dispersion thereof, said ink comprising, as the recording agent, a compound represented by the general formula (A)

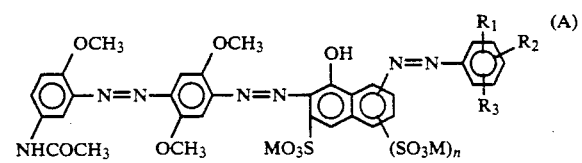

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

35 Claims, 3 Drawing Sheets

INK, AND INK-JET RECORDING METHOD AND APPARATUS EMPLOYING THE INK

BACKGROUND OF THE INVENTION

1. Field of the Invention

The present invention relates to an ink, an ink-jet recording method employing the ink, and an apparatus employing the ink. More particularly, the present invention relates to a recording liquid which gives high density and water resistance of printed letters on non-coated paper such as wood-free paper, paper for copying, bond paper, paper for reporting, and the like, and which gives improved indoor discoloration of an image recorded on coated paper having an image-receiving layer thereon composed of a binder and a pigment. The present invention also relates to an ink-jet recording method, an ink-jet recording unit, an ink-jet recording apparatus, and an ink cartridge.

2. Related Background Art

Heretofore, aqueous inks having a water-soluble dye dissolved in an aqueous medium have been used for ink-jet recording. The inks for such a use are required to have the properties as below:

(1) giving sufficient density of images,
(2) having satisfactory drying property on recording mediums,
(3) causing little feathering or running of images,
(4) causing no flowing-out of the recorded images when brought into contact with water, alcohol, or the like, or allowing satisfactory decipherment even when some flowing out occurs (water-resistance),
(5) giving high light-fastness of recorded images,
(6) causing no clogging of a tip of a pen or a nozzle,
(7) causing no inconvenience in printed images such as blurring and scratching in continuous recording or at the re-start of recording after a long term of intermission of the recording (ejection stability),
(8) being stable during storage,
(9) causing no problem on contact with a constituting member of a recording means on use,
(10) giving no hazard to an operator, and so forth. Furthermore, in an ink-jet recording system, utilizing thermal energy, the property below is required in addition to the above requirements:

(11) having high heat resistance, and giving no adverse influence to a thermal energy-generating means.

As a specific example of the dye, C.I. Food Black 2 is mainly used in ink-jet recording for both mono-color and full-color images (see Japanese Patent Application Laid-open No. 59-93766, and No. 59-93768).

An ink using C.I. Food Black 2 is satisfactory in density of recorded images, but still involves problems on light-fastness and water-resistance of recorded images: the black color turns brown on prolonged light exposure or on posting-up of printed matters in proximity to a copying machine, resulting in remarkable deterioration of the image quality, and difficulty in decipherment in test of water-spilling.

An ink is disclosed which has ejection stability, water resistance of images, and other properties improved by introducing at least one specific structural unit into a dye structure in Japanese Patent Application Laid-open No. 1-135880. Further, a recording liquid of black color is disclosed, in Japanese Patent Application Laid-open No. 1-193375, which has high affinity to recording media, and is superior in fixability and water-resistance, giving satisfactory quality of printed letters on an ordinary paper. Furthermore, a recording liquid is disclosed which is improved in ejection stability, and light fastness of images in Japanese Patent Publication No. 62-010274.

The ink is required firstly to have suitability for an employed recording system, and secondly is required to give satisfactory properties of printed matters such as quality and fastness of the images. However, it is considerably difficult to satisfy simultaneously all of the aforementioned various requirements on performances, as understood from the prior art disclosures cited above.

The quality of the printed letters mostly depends on a liquid medium of the ink, although it depends secondarily on properties of the dye itself.

The fastness of the printed matter is directly influenced by the dye properties. In particular, light-fastness is the most important of the fastnesses, and improvement of the light-fastness has been tried as described above.

Another problem, which has not been noticed but has come to be noticed as a consequence of technical progress, is discoloration or color change. The discoloration is especially serious in black ink which is used in a large quantity. In full color images, the image quality deteriorates rapidly by the discoloration.

The discoloration proceeds indoors also without direct sunlight illumination. The discoloration further depends on the kind of a recording medium for forming images thereon, being remarkable on paper containing silica or the like as a pigment. The widely used C.I. Food Black 2 is not free from this problem.

Dyes having satisfactory light-fastness have been sought in order to cancel the disadvantage of C.I. Food Black 2. Consequently, dyes are found which are satisfactory for use on ordinary paper. However, the ink causing less problems on ordinary paper discolors significantly on coated paper which has an ink-receiving layer formed on a substrate and containing a pigment and a binder for the purpose of improving image quality such as color-developing property of the dyes, sharpness, and resolution. Thus the problem is not solved by merely employing a light-fast dye.

SUMMARY OF THE INVENTION

An object of the present invention is to provide a black ink which has the above generally required properties and gives no discoloration of the image even on coated paper.

Another object of the present invention is to provide an ink-jet recording method and an apparatus employing the ink.

According to an aspect of the present invention, there is provided an ink containing a recording agent and a liquid medium for dissolution or dispersion thereof, the ink comprising, as the recording agent, a compound represented by the general formula (A)

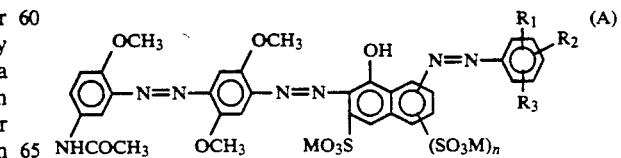

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

According to another aspect of the present invention, there is provided an ink-jet recording method for recording on a recording medium with droplets of ink, the ink being a liquid composition containing at least one compound represented by the general formula (A) above.

According to still another aspect of the present invention, there is provided a recording unit having an ink container portion for holding an ink and a head portion for ejecting the ink in droplets, the ink being a liquid composition containing at least one compound represented by the general formula (A) above.

According to a further aspect of the present invention, there is provided an ink cartridge having an ink container portion for holding an ink, the ink being a liquid composition containing at least one compound represented by the general formula (A) above.

According to a still further aspect of the present invention, there is provided an ink-jet recording apparatus having a recording unit described above.

According to a still further aspect of the present invention, there is provided a method for using the ink described above.

DETAILED DESCRIPTION OF THE PREFERRED EMBODIMENT

Figure 1A:
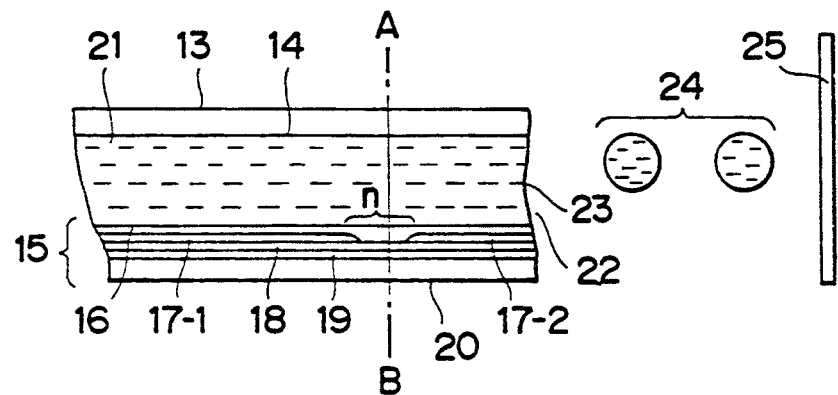
FIG. 1A, and FIG. 1B are respectively a longitudinal cross-sectional view and a lateral cross-sectional view of a head portion of an ink-jet recording apparatus.

The ink of the present invention comprises a compound represented by the general formula (A) below:

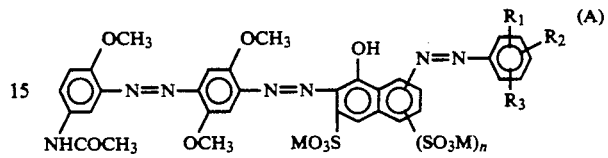

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

According to the present invention, use of the above-described compound as the coloring matter for an ink provides an ink which gives less indoor discoloration of image even on coated paper.

Preferred embodiments of the present invention are described to explain the present invention in more detail.

The specific examples of the compounds (or dyes) represented by the general formula (A) above which mainly characterize the present invention include:

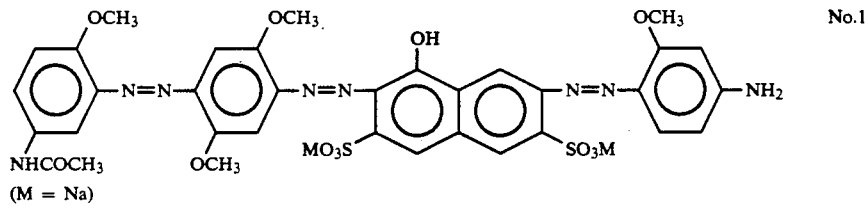

No.1
(M = Na)

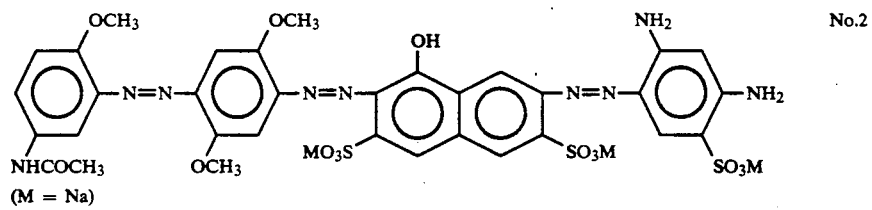

No.2
(M = Na)

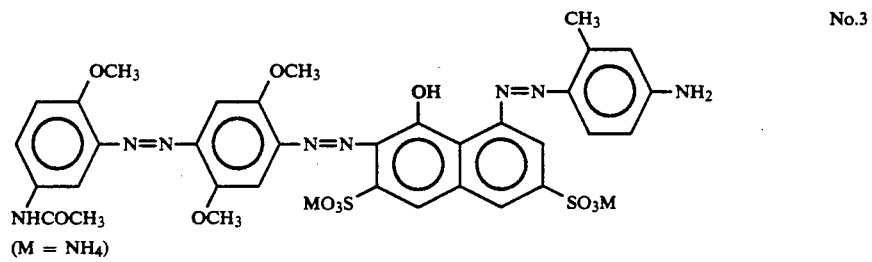

No.3
(M = NH$_4$)

-continued
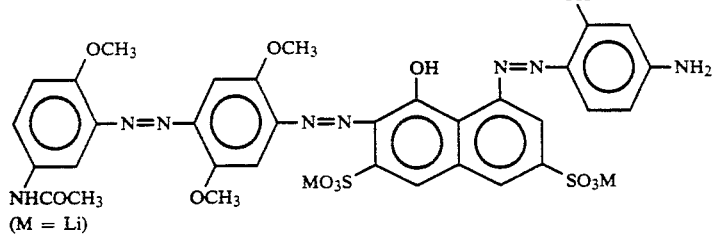
(M = Li)
No.4
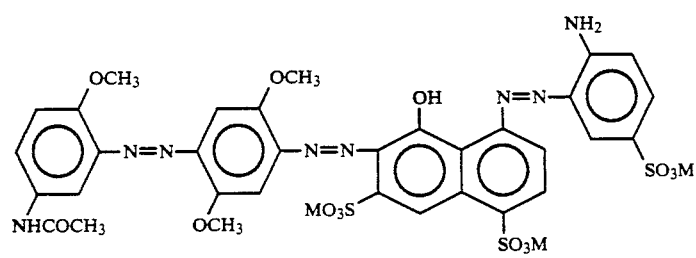
(M = NH₃CH₂CH₂OH)
No.5
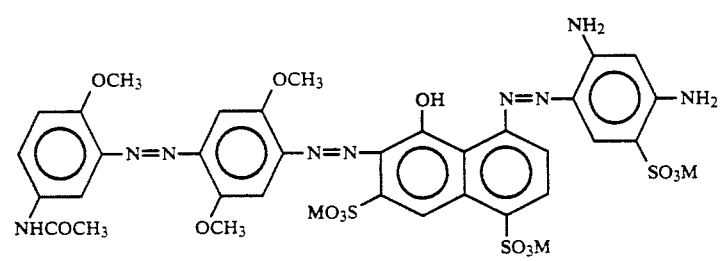
(M = K)
No.6
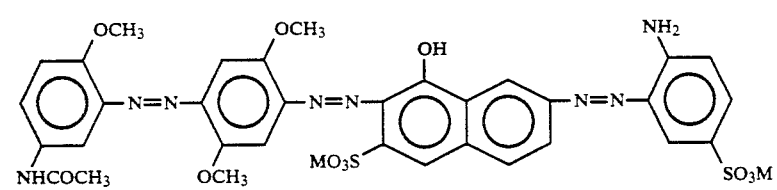
(M = Na)
No.7
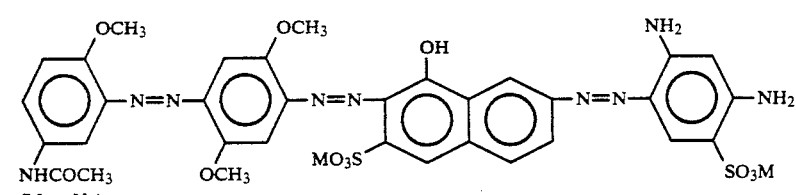
(M = Na)
No.8
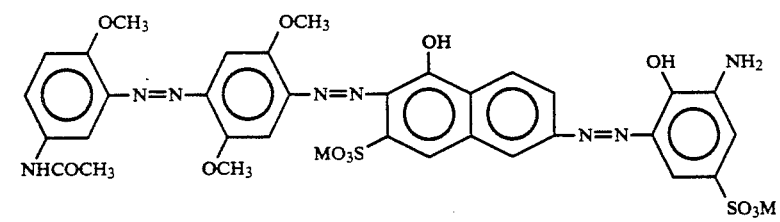
(M = Li)
No.9
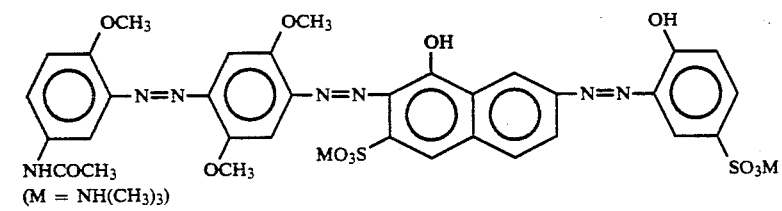
(M = NH(CH₃)₃)
No.10

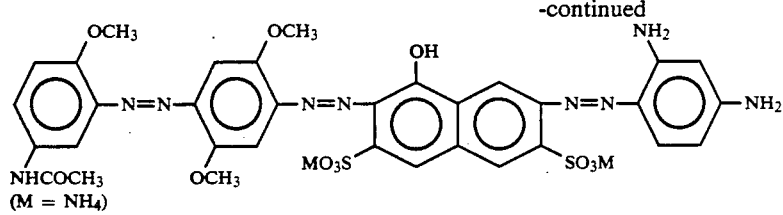
No.11

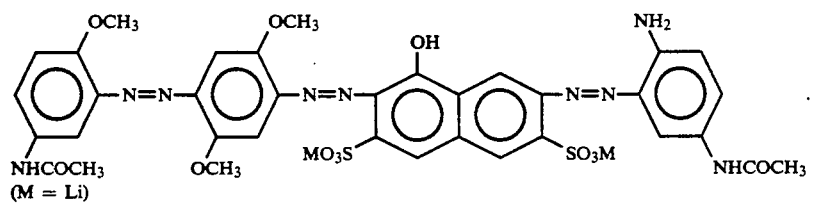
No.12

Among the dyes above, more preferable are those in which the azo groups are bonded to 2- and 7-positions of the naphthalene ring.

The dyes used in the present invention are generally sodium salts of compounds having water-soluble groups such as a sulfonic acid group. The dyes, however, are not limited to sodium salts, but include dyes having other counter ions such as potassium, lithium, ammonium, organic amines or the like, which are effective similarly.

The above dyes are synthesized according to a conventional manner such as described in "Theory and Production in Dye Chemistry" by Yutaka Hosoda, as below.

SYNTHESIS EXAMPLE

The exemplified Dye No. 2 is synthesized as follows. 3'-amino-4'-methoxyacetanilide is diazotized in a conventional manner, and is coupled with 2,5-dimethoxyaniline. The product is further diazotized by sodium nitrite and coupled with 2R acid. Still further, the product is diazotized by sodium nitrite and is added to a solution of m-phenylenediamine-4-sulfonic acid to be coupled at a range of from 4 to 5. The resulting dye is salted out by addition of sodium chloride and is collected by filtration. Impurities are eliminated from the product by repetition of dissolution in water, salting-out by sodium chloride, and collection by filtration. Thereafter, the product is purified by means of ultrafiltration apparatus (made by Sartorius GmbH). Thus the exemplified Dye No. 2 is synthesized.

The amount of the aforementioned dye to be used in the ink of the present invention is generally within the range of from 0.1 to 15% by weight, preferably 0.5 to 10% by weight, still more preferably from 0.5 to 6% by weight of the total weight of the ink, although the amount is not specially limited thereto.

A suitable aqueous medium for the ink of the present invention is water or a mixed solvent composed of water and a water-soluble organic solvent.

The water to be used is preferably deionized water, and not ordinary water containing various ions.

Suitable water-soluble organic solvents to be mixed with water include alcohols having 1 to 5 carbons such as methyl alcohol, ethyl alcohol, n-propyl alcohol, isopropyl alcohol, n-butyl alcohol, sec-butyl alcohol, tert-butyl alcohol, isobutyl alcohol, n-pentanol, etc.; amides such as dimethylformamide, dimethylacetamide, etc.; ketones and ketoalcohols such as acetone, diacetone alcohol, etc.; cyclic ethers such as dioxane, etc.; polyalkylene glycols such as polyethylene glycol, polypropylene glycol, etc.; alkylene glycols having an alkylene group of 2 to 6 carbons such as ethylene glycol, propylene glycol, butylene glycol, triethylene glycol, 1,2,6-hexane triol, thiodiglycol, hexylene glycol, diethylene glycol, etc.; glycerin; lower alkyl ethers of a polyhydric alcohol such as ethylene glycol monomethyl (or monoethyl) ether, diethylene glycol monomethyl (or monoethyl) ether, triethylene glycol monomethyl (or monoethyl) ether, etc.; lower alkyl diethers of a polyhydric alcohol such as triethylene glycol dimethyl (or diethyl) ether, tetraethylene glycol dimethyl (or diethyl) ether, etc.; sulfolane, N-methyl-2-pyrrolidone, 1,3-dimethyl-2-imidazolidinone, and the like.

A suitable organic solvent is selected and used from the above solvents and the like. In particular, glycerin or a polyethylene oxide of a polymerization degree of 3 to 6 is preferable for prevention of clogging with ink; a nitrogen-containing cyclic compound or an ether compound of a polyalkylene oxide is preferable in view of image density and ink ejection stability; and use of a lower alkyl alcohol or a surfactant is preferable in view of frequency responsiveness. Accordingly, the preferable composition of the solvent in the present invention contains a main component as above in addition to water.

The content of the above water-soluble organic solvent in the ink is generally in the range of from 2 to 80% by weight, preferably from 3 to 70% by weight, still more preferably from 4 to 60% by weight of the total weight of the ink.

The amount of water to be used is generally in the range of from 10 to 97.5% by weight, preferably not less than 35% by weight, still more preferably not less than 45% by weight of the total weight of the ink. At a less amount of the water, a low-volatile organic solvent remains in a formed image, which undesirably causes problems of migration of the dye and running or feathering of the formed image.

The ink of the present invention may optionally contain a pH-adjusting agent, a viscosity-adjusting agent, a surface tension-adjusting agent, or the like in addition to the components described above. The pH-adjusting agent includes amines such as diethanolamine, triethanolamine, etc.; inorganic alkali salts including hydroxides such as sodium hydroxide, lithium hydroxide, potassium hydroxide, etc.; organic acid salts such as lithium acetate, etc.; organic acids, mineral acids, and the like.

The ink of the present invention desirably has properties of a viscosity at 25° C. within the range of from 1 to 20 cps, preferably from 1 to 15 cps; a surface tension of not less than 30 dyn/cm, preferably not less than 40 dyn/cm; and pH within the range of from 4 to 10.

As the recording method for the ink of the present invention, effective is an ink-jet recording system. As the recording medium therefor, coated paper is effective to obtain an image with high sharpness and high resolution.

The recording medium used in the present invention may be of any media including general-purpose ordinary paper (e.g., wood-free paper, medium-quality paper, and bond paper), coated paper, plastic OHP films, and the like. In particular, use of coated paper will achieve considerable effects. The coated paper, which is generally constructed from wood-free paper as the base material and an ink-receiving layer formed thereon composed of a pigment and a binder, includes in the present invention such paper having an ink receiving layer in which paper fibers of the base material exist mixedly in the ink-receiving layer.

The ink of the present invention is especially suitable for an ink-jet recording method, which is a type of ejecting ink upon utilizing the foaming phenomenon of ink caused by thermal energy, because the ink has the characteristics of extremely high stability of ink ejection and non-occurrence of a satellite dot. For this use, thermal properties of the ink is sometimes adjusted (e.g., specific heat, thermal expansion coefficient, thermal conductivity, etc.).

The ink of the present invention, which is employed particularly suitably for an ink-jet recording method for recording by ejecting ink droplets by thermal energy, is naturally useful also for general writing utensils.

The methods and the apparatus suitable for the use of the ink of the present invention are those which provide thermal energy to ink in a cell in a recording head in correspondence with recording signals to form liquid droplets by the thermal energy.

Figure 1B:
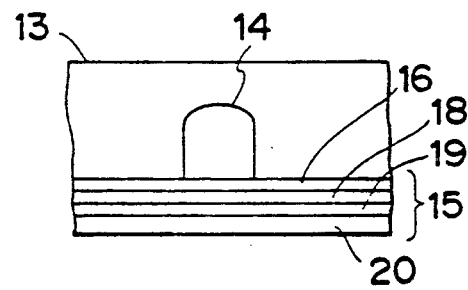
Figure 2:
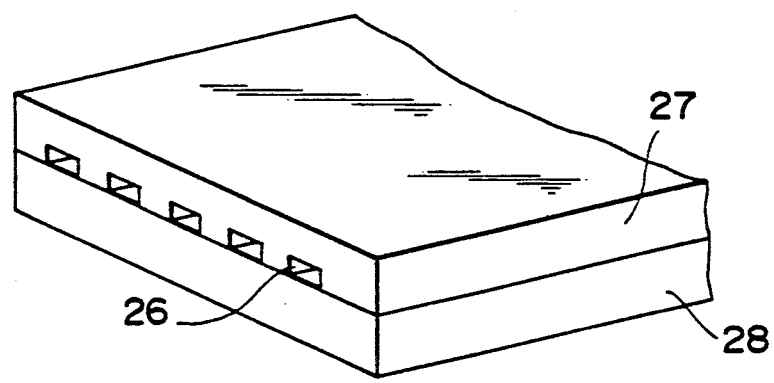
FIG. 2 is an oblique view of a multiplicate form of the head of FIG. 1.

An example of the constitution of the heads, which is a main portion of the apparatus, is shown in FIG. 1A, FIG. 1B, and FIG. 2.

A head 13 is formed by bonding a plate of glass, ceramics, or plastics having a groove 14 with a heat-generating head 15. (The type of the head is not limited to the one shown in the figure.) The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having a good heat-releasing property made of alumina or the like.

Ink 21 reaches the ejection orifice 22 (a fine pore), forming a meniscus by action of pressure P not shown in the figure.

On application of an electric signal to the electrodes 17-1 and 17-2, the region designated by a symbol "n" on the heat-generation head 15 generates heat abruptly to form a bubble in the ink 21 at the position adjacent thereto. The pressure generated by the bubble pushes out the meniscus 23 and ejects the ink 21, as recording droplets 24, and the ink droplets fly to a recording medium 25. FIG. 2 illustrates an appearance of a multi-head constructed by juxtaposing a multiplicity of heads shown in FIG. 1A. The multi-head is prepared by bonding a glass plate having multi-grooves with a heat-generation head 28 similar to the one described in FIG. 1A.

Incidentally, FIG. 1A is a cross-sectional view of the head 13 along an ink flow path, and FIG. 1B is a cross-sectional view of the head at the line A-B in FIG. 1A.

Figure 3:
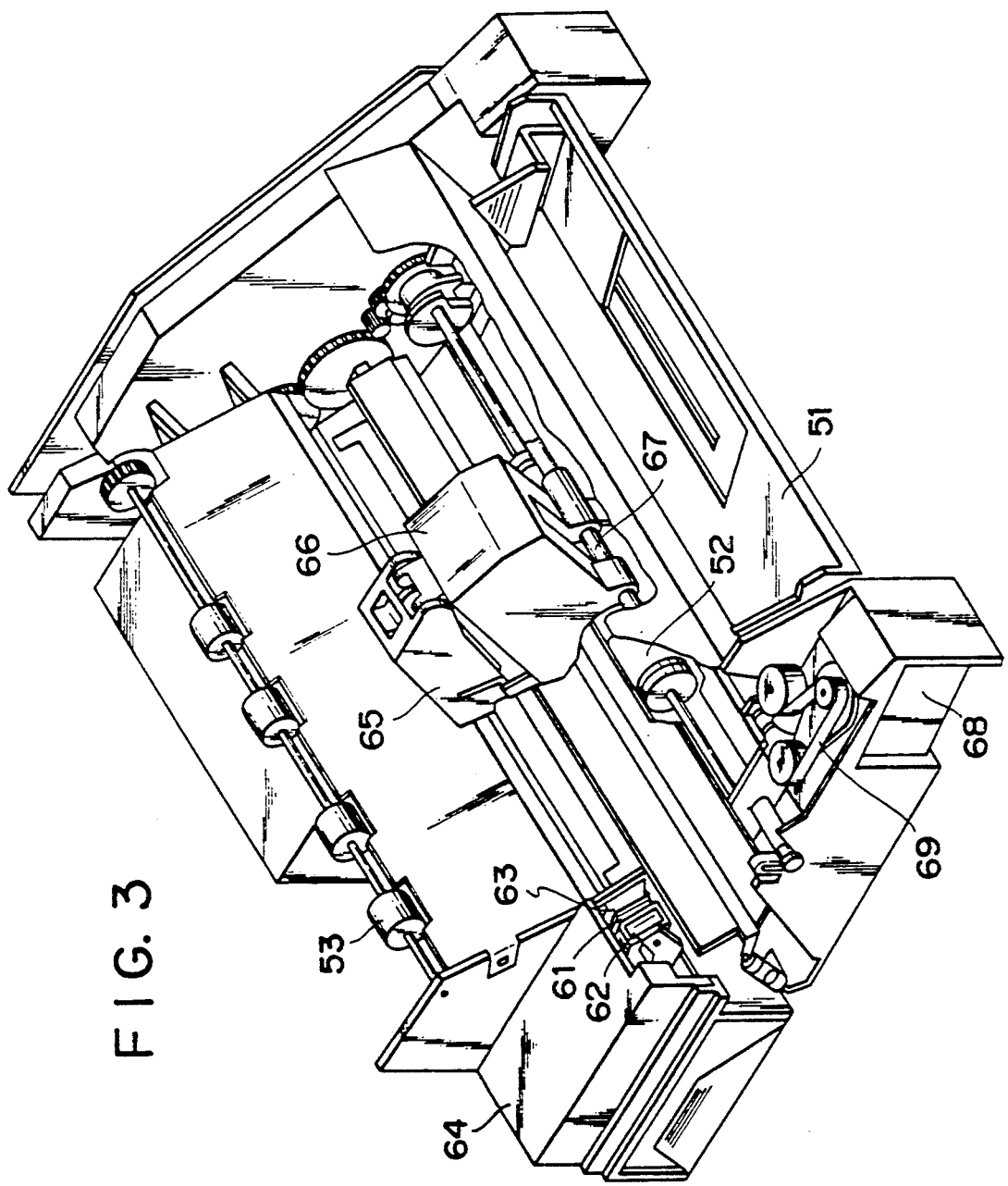
FIG. 3 is an oblique view of an ink-jet recording apparatus.

FIG. 3 illustrates an example of the ink-jet recording apparatus having such a head mounted therein.

In FIG. 3, a blade 61 as a wiping member is held at one end by a blade-holding member. The blade 61 is placed at a position adjacent to the recording region of the recording head, and in this example, is held in protrusion into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held in protrusion into the moving path of the recording head in a manner similar to that of the blade 61. The aforementioned blade 61, the cap 62 and the absorption member 63 constitute an ejection-recovery portion 64, and the blade 61 and the absorption member 63 remove water, dust, and the like from the ink ejecting nozzle face.

A recording head 65 has an ejection energy generation means for ejection, and conducts recording by ejecting ink toward a recording medium opposing the ejection nozzle face. A carriage 66 is provided for supporting and moving the recording head 65. The carriage 66 is engaged slidably with a guide rod 67. A portion of the carriage 66 is connected (not shown in the figure) to a belt 69 driven by a motor 68, so that the carriage 66 is movable along the guide rod 67 to the recording region of the recording head and an adjacent region thereto.

The constitution of a paper delivery portion 51 for delivery of a recording medium and a paper delivery roller 52 driven by a motor (not shown in the figure) delivers the recording medium to the position opposing to the ejecting nozzle face of the recording head, and the recording medium is discharged with the progress of the recording to paper discharge portion provided with paper-discharge rollers 53.

In the above constitution, the cap 62 of the ejection-recovery portion 64 is out of the moving path of the recording head 65, while the blade 61 is protruded toward the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
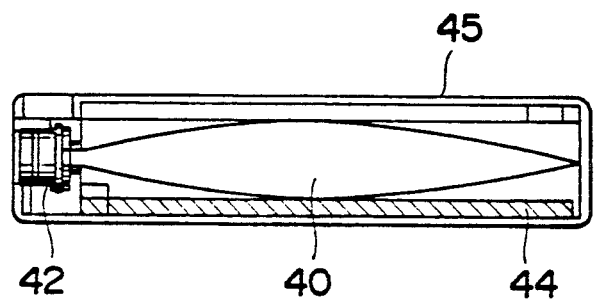
FIG. 4 is a longitudinal cross-sectional view of an ink cartridge.

FIG. 4 illustrates an example of the ink cartridge 45 containing ink to be supplied through an ink supplying member such as a tube (not shown). The ink container portion 40, for example an ink bag, contains an ink to be supplied, and has a rubber plug 42 at the tip. By inserting a needle (not shown in the figure) into the plug 42, the ink in the ink container portion 40 is made suppliable. An absorption member 44 absorbs waste ink.

The ink container portion has preferably a liquid-contacting face made of polyolefin, especially polyethylene in the present invention.

Figure 5:
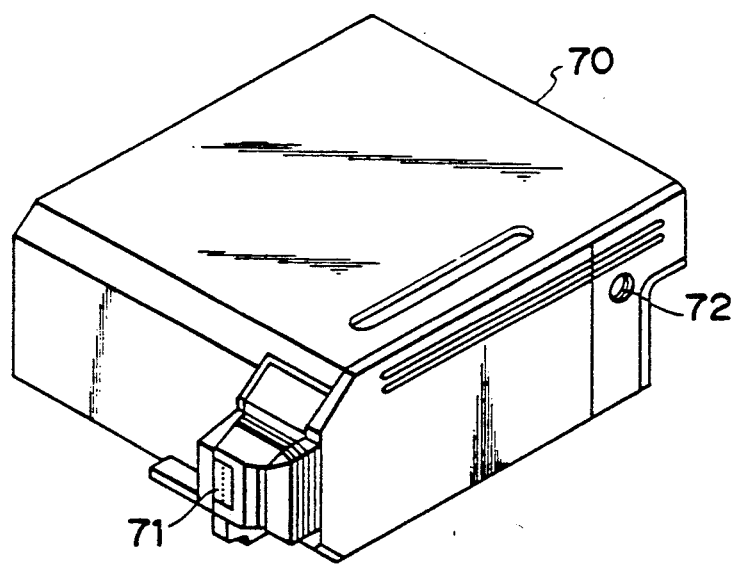
FIG. 5 is an oblique view of a recording unit.

The ink-jet recording apparatus used in the present invention is not limited to the above-mentioned one which has separately a head and an ink cartridge, but integration thereof as shown in FIG. 5 may suitably be used.

In FIG. 5, a recording unit 70 houses an ink container portion such as an ink absorption member, and the ink in the ink absorption member is ejected from a head 71 having a plurality of orifices. The material for the ink absorption member is preferably polyurethane in the present invention.

Air-communication opening 72 is provided to communicate interior of the cartridge with the open air.

The recording unit 70 may be used in place of the recording head shown in FIG. 3, and is readily mountable to and demountable from the carriage 66.

The present invention is described in more detail referring to examples and comparative examples. The term "part" in the description is base on weight unless otherwise mentioned.

EXAMPLES

(1) Preparation of Ink

The components shown in Table 1 below were mixed and dissolved. The mixture was filtered through a filter having a pore diameter of 0.45 μm to provide a plurality of kinds of ink of the present invention as shown in Table 1.

TABLE 1

| No. | Ink components | Quantity used |
|---|---|---|
| 1 | Exemplified dye No. 1 | 3 parts |
|   | Diethylene glycol | 25 parts |
|   | Pure water | 72 parts |
| 2 | Exemplified dye No. 2 | 3 parts |
|   | Diethylene glycol | 20 parts |
|   | N-methyl-2-pyrrolidone | 15 parts |
|   | Pure water | 62 parts |
| 3 | Exemplified dye No. 3 | 3 parts |
|   | Polyethylene glycol 300 | 20 parts |
|   | Pure water | 77 parts |
| 4 | Exemplified dye No. 4 | 3 parts |
|   | Ethylene glycol | 25 parts |
|   | Pure water | 72 parts |
| 5 | Exemplified dye No. 5 | 3 parts |
|   | Glycerin | 15 parts |
|   | Pure water | 82 parts |
| 6 | Exemplified dye No. 6 | 3 parts |
|   | Diethylene glycol | 15 parts |
|   | Ethylene glycol monoethyl ether | 10 parts |
|   | Pure water | 72 parts |
| 7 | Exemplified dye No. 7 | 3 parts |
|   | Ethylene glycol | 20 parts |
|   | Isopropyl alcohol | 5 parts |
|   | Pure water | 72 parts |
| 8 | Exemplified dye No. 8 | 3 parts |
|   | Glycerin | 15 parts |
|   | N-methyl-2-pyrrolidone | 10 parts |
|   | Pure water | 72 parts |
| 9 | Exemplified dye No. 9 | 3 parts |
|   | Ethylene glycol | 20 parts |
|   | Ethanol | 5 parts |
|   | Pure water | 72 parts |
| 10 | Exemplified dye No. 10 | 3 parts |
|    | Diethylene glycol | 25 parts |
|    | Pure water | 72 parts |
| 11 | Exemplified dye No. 11 | 3 parts |
|    | Polyethylene glycol 300 | 20 parts |
|    | Isopropyl alcohol | 10 parts |

TABLE 1-continued

| No. | Ink components | Quantity used |
|---|---|---|
|    | Pure water | 67 parts |
| 12 | Exemplified dye No. 12 | 3 parts |
|    | Diethylene glycol | 20 parts |
|    | n-Propyl alcohol | 5 parts |
|    | Pure water | 72 parts |

(2) Application examples

The inks shown in Table 1 above were respectively mounted on an ink-jet printer BJ-80A (made by Canon K.K., nozzle size: 50×40 μm, 24 nozzles) employing a heat-generating element as an ink-ejecting energy source. Printing was conducted on the recording mediums shown below for evaluation regarding the items of (a) clogging on re-start of printing after a short intermission of printing, (b) recoverability from clogging on re-start of printing after a long term of intermission of printing, and (c) resistance of printed image to discoloration.

Recording medium A: Coated paper NM for ink-jet (trade name, made by Mitsubishi Paper Mills, Ltd.)

Recording medium B: Coated paper FC-3 for ink-jet (trade name, made by Jujo Paper Mfg. Co., Ltd.)

Recording medium C: Coated paper IJ Mat Coat M for ink-jet (trade name, made by Mitsubishi Paper Mills, Ltd.)

Recording medium D: Copying paper, Canon Paper Dry (trade name made by Canon Sales Co., Inc.)

(3) Method and Results of Evaluation (a) Clogging on re-start of printing after a short intermission of printing Alphabetical and numeral letters were printed continuously for 10 minutes on the Recording medium C by employing the ink filled in the printer. Then the printer was left standing without capping for 10 minutes under the conditions of 20° C.±5° C. and 50±10% RH. Thereafter alphabetical and numeral letters were again printed, and the presence or absence of defects such as blurring and chipping of printed letters was examined. As the result, no defect was observed.

(b) Recoverability from clogging after a long term of intermission of printing

Alphabetical and numeral letters were printed continuously for 10 minutes on the Recording medium C by employing the ink filled in the printer. Then the printer was left standing without capping for 7 days under the conditions of 60° C. and 10±5% RH. Thereafter operation for recovery from nozzle clogging was conducted, and the repetition times of the recovery operation was counted which is required to conduct normal printing without defects such as blurring and chipping of letters. As the result, repetition of the recovery operation of from one to five times of the recovery operation was enough for normal printing.

(c) Resistance to discoloration

Solid printing was conducted on the recording mediums A, B, C, and D in a size of 10 mm×30 mm. The printed recording mediums were left standing for 30 minutes in a dark chamber containing ozone at a concentration of 0.3±0.05% by volume for accelerating discoloration. The color difference ($\Delta E^*ab$) caused by the 30 minute standing was measured (according to JIS Z8730). The results are shown in Table 2.

TABLE 2

| Ink No. | ΔE*ab Recording medium | | | |
|---|---|---|---|---|
| | A | B | C | D |
| 1 | 4.2 | 3.6 | 5.1 | 2.7 |
| 2 | 5.5 | 4.8 | 5.2 | 3.0 |
| 3 | 4.9 | 4.2 | 4.5 | 2.9 |
| 4 | 4.8 | 5.0 | 4.1 | 3.1 |
| 5 | 5.1 | 4.9 | 4.2 | 3.3 |
| 6 | 6.0 | 5.9 | 4.6 | 4.0 |
| 7 | 5.2 | 5.0 | 4.7 | 4.1 |
| 8 | 5.4 | 4.0 | 3.9 | 3.7 |
| 9 | 6.1 | 5.5 | 5.6 | 4.2 |
| 10 | 5.6 | 5.6 | 4.8 | 3.0 |
| 11 | 5.1 | 4.5 | 4.2 | 3.4 |
| 12 | 6.1 | 5.9 | 5.2 | 3.9 |

The color difference of any of the printed matters caused by exposure to indoor light for three months was not more than 3.

COMPARATIVE EXAMPLES

The inks shown in Table 3 below were prepared by mixing the components in Table 3 and treating them in the same manner as in the Examples. Each ink was employed for solid printing on the recording mediums A, B, and C by means of the same recording apparatus as in Examples. The test specimens of the printed matters were subjected to the test in the aforementioned ozone-containing test chamber in the same manner as above. As the results, all of the values ΔE*ab were not less than 20. The color differences after exposure to indoor light for three months were not less than 12 for all of the samples.

TABLE 3

| No. | Ink components | Quantity used |
|---|---|---|
| 13 | Undermentioned dye 13 | 3 parts |
| | Diethylene glycol | 25 parts |
| | Pure water | 72 parts |
| 14 | Undermentioned dye 14 | 3 parts |
| | Ethylene glycol | 20 parts |
| | Polyethylene glycol 300 | 10 parts |
| | Pure water | 67 parts |
| 15 | Undermentioned dye No. 15 | 3 parts |
| | Glycerin | 15 parts |
| | Diethylene glycol monoethyl ether | 10 parts |
| | Pure water | 72 parts |
| 16 | Undermentioned dye No. 16 | 3 parts |
| | Diethylene glycol | 20 parts |
| | Isopropyl alcohol | 5 parts |
| | Pure water | 72 parts |
| 17 | Undermentioned dye No. 17 | 3 parts |
| | Ethylene glycol | 20 parts |
| | N-methyl-2-pyrrolidone | 10 parts |
| | Pure water | 67 parts |

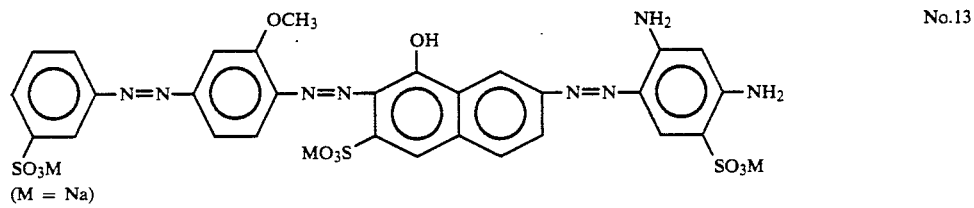

No.13

(M = Na)

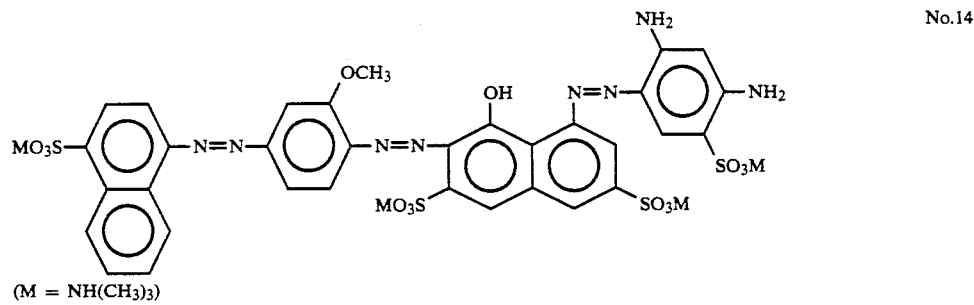

No.14

(M = NH(CH$_3$)$_3$)

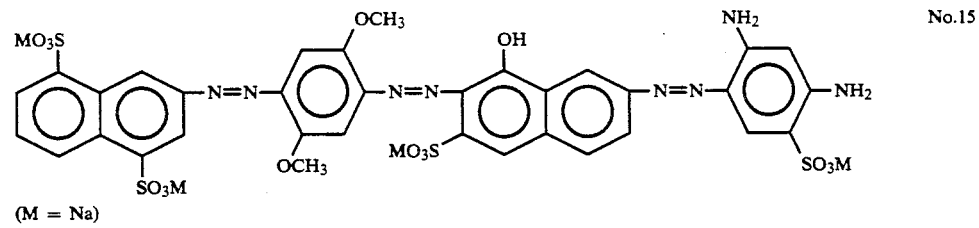

No.15

(M = Na)

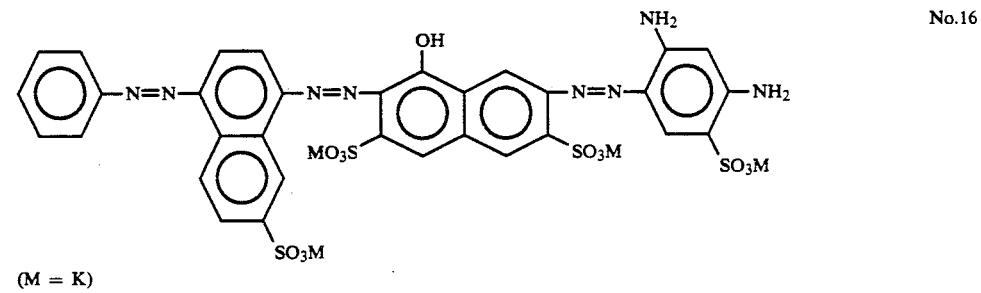

No.16

(M = K)

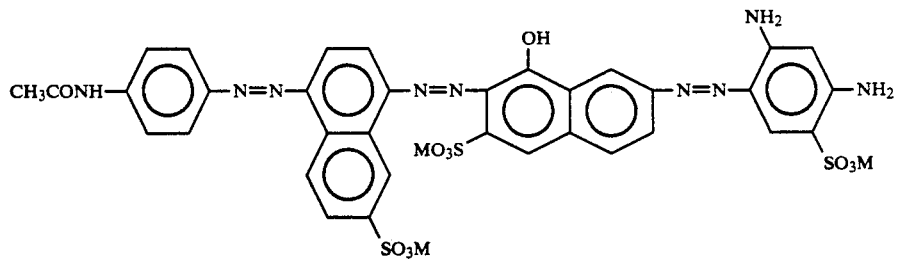

(M = Na)

In the present invention, the use of the compound (or dye) represented by the general formula (A) as the dye in an ink gives a recording liquid which has the properties required for printed matters on ordinary paper and forms images of less discoloration on coated paper. Further the use thereof gives an image of high image quality, exhibiting high resolution and less discoloration, and having satisfactory fastness properties.

The ink of the present invention exhibits the aforementioned characteristics sufficiently at the neutral range of pH 4 to 10, which is satisfactory in view of safety because of no need of addition for strongly alkaline substances as described in Japanese Patent Application Laid-open No. 56-57862.

Furthermore, the ink of the present invention, even when applied to ink-jet recording method which ejects ink by action of thermal energy, can be used stably for long time without forming an adhering matter on the heater, and does not change its physical properties or forming no solid deposit during storage.

What is claimed is:

1. An ink containing a recording agent and a liquid medium for dissolution or dispersion thereof, said ink comprising, as the recording agent, a compound represented by the general formula (A)

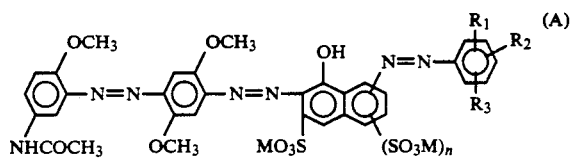

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

2. The ink of claim 1, wherein the compound represented by the general formula (A) is at least one selected from the following compounds of from No. 1 to No. 12:

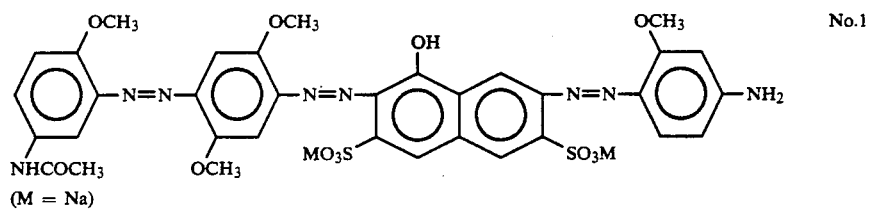

(M = Na)

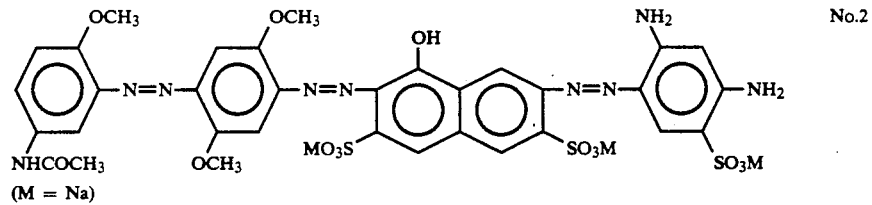

(M = Na)

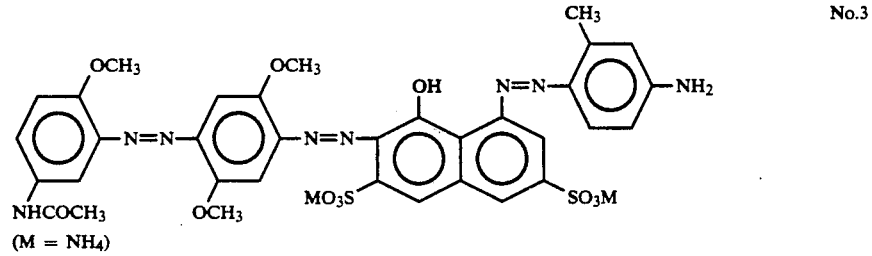

(M = NH₄)

-continued
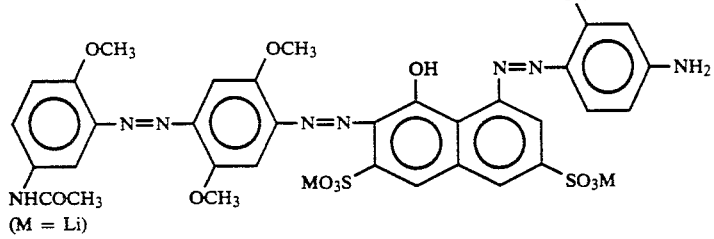
(M = Li)
No.4
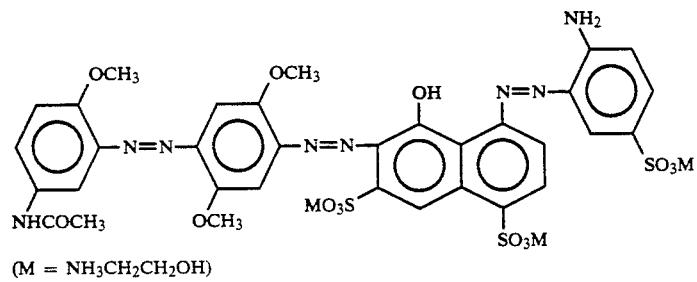
(M = NH₃CH₂CH₂OH)
No.5
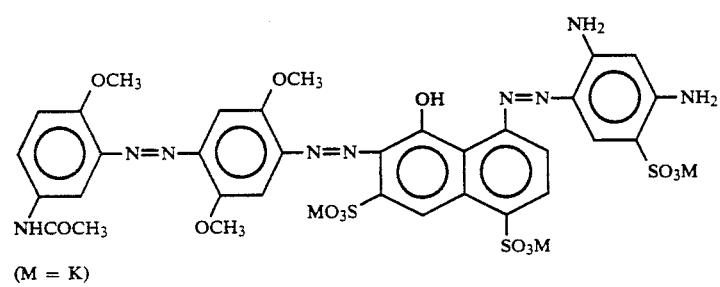
(M = K)
No.6
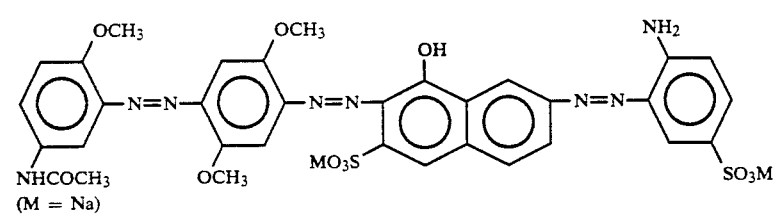
(M = Na)
No.7
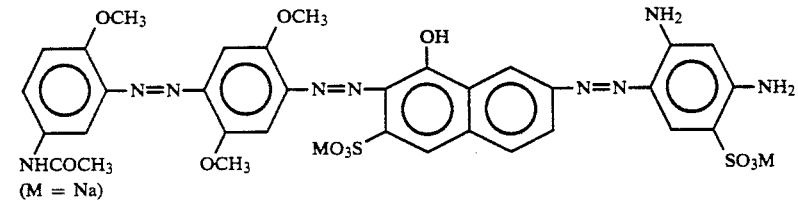
(M = Na)
No.8
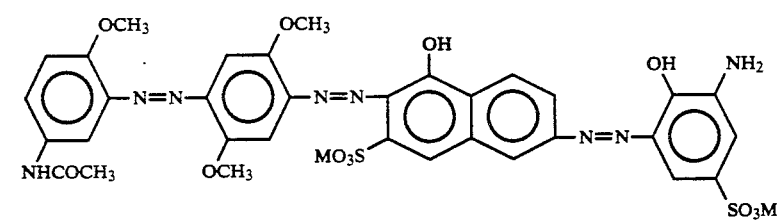
(M = Li)
No.9
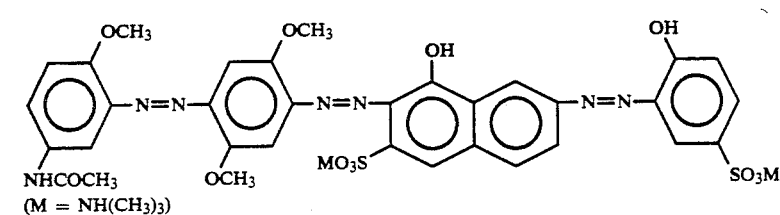
(M = NH(CH₃)₃)
No.10

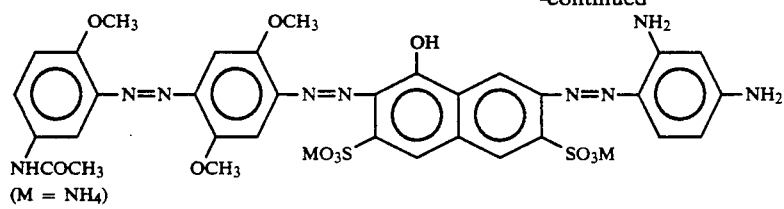

No.11
(M = NH4)

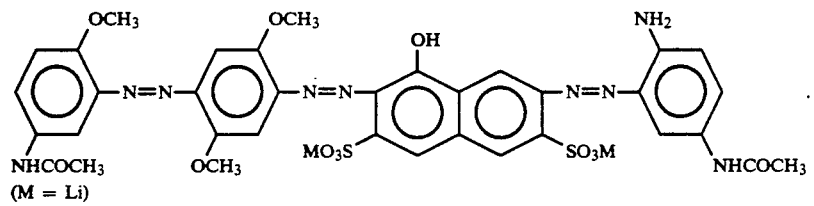

No.12
(M = Li)

3. The ink of claim 1, wherein pH of the ink is within the range of from 4 to 10.

4. The ink of claim 1, wherein said recording agent is contained in an amount within the range of from 0.1 to 15% by weight of the total weight of the ink.

5. The ink of claim 1, wherein the liquid medium comprises a mixed solvent of water and a water-soluble organic solvent.

6. The ink of claim 5, wherein the water is contained in an amount within the range of from 10 to 97.5% by weight of the total weight of the ink.

7. The ink of claim 5, wherein the water-soluble organic solvent is contained in an amount within the range of from 2 to 80% by weight of the total weight of the ink.

8. In an ink-jet recording method for recording on a recording medium with droplets of ink, the improvement comprising employing a liquid ink composition containing at least one compound represented by the general formula (A)

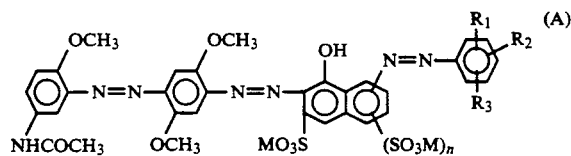

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

9. In the ink-jet recording method of claim 8, wherein the compound represented by the general formula (A) is at least one selected from the following compounds of from No. 1 to No. 12:

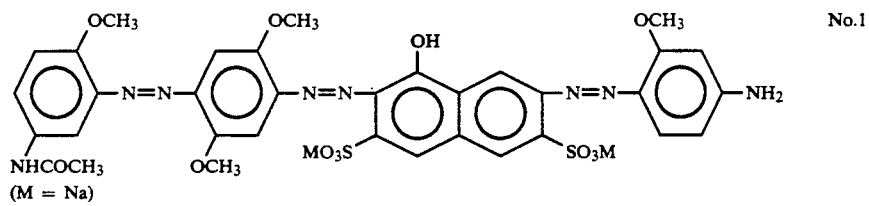

No.1
(M = Na)

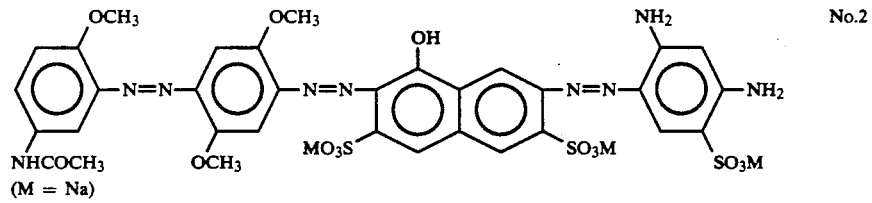

No.2
(M = Na)

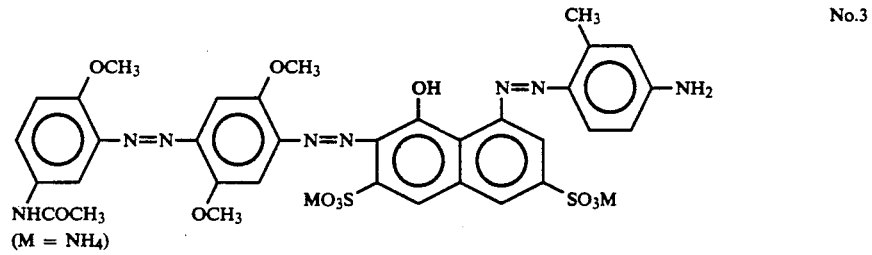

No.3
(M = NH4)

-continued
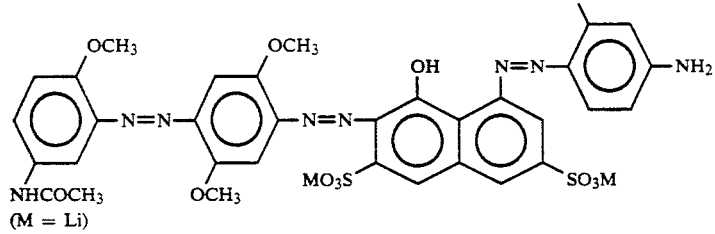
No.4
(M = Li)
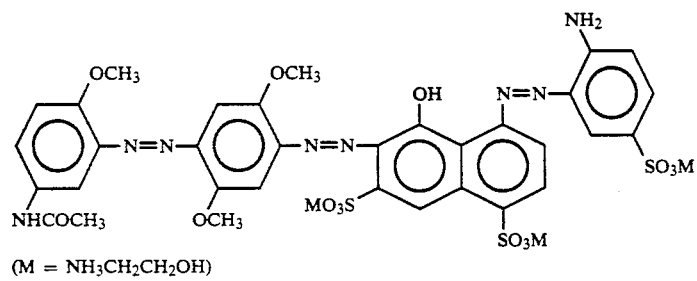
No.5
(M = NH₃CH₂CH₂OH)
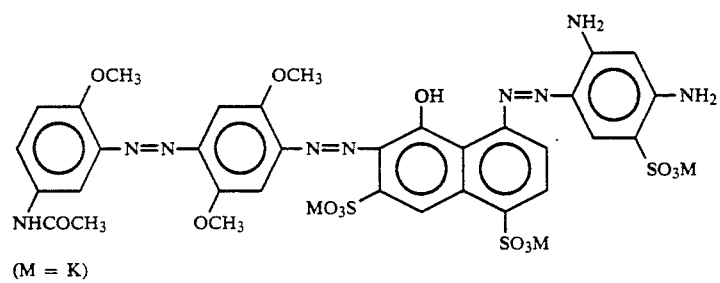
No.6
(M = K)
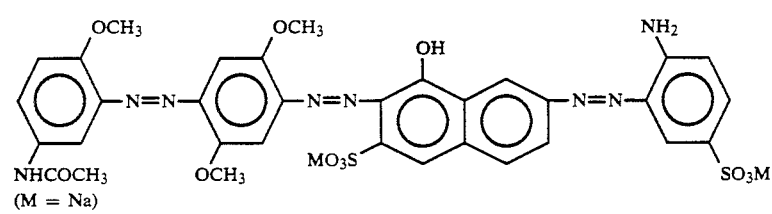
No.7
(M = Na)
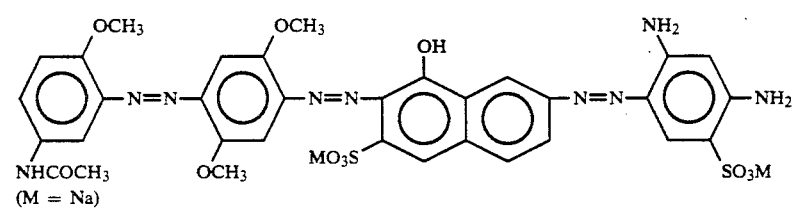
No.8
(M = Na)
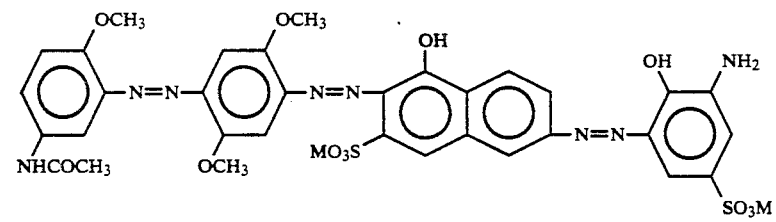
No.9
(M = Li)
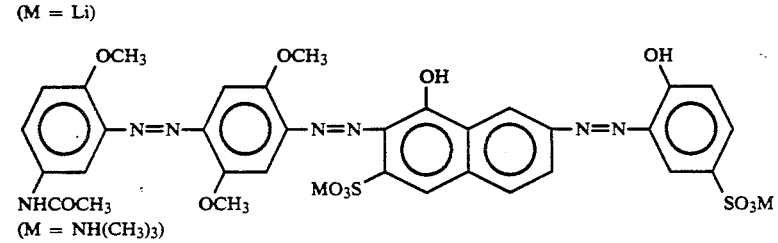
No.10
(M = NH(CH₃)₃)

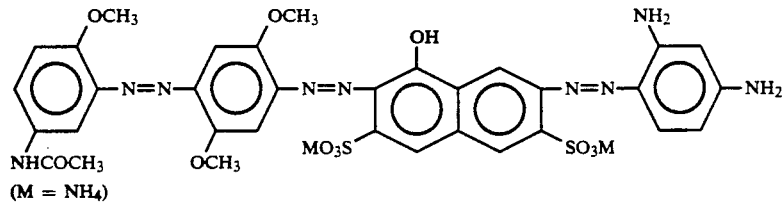

No.11

(M = NH4)

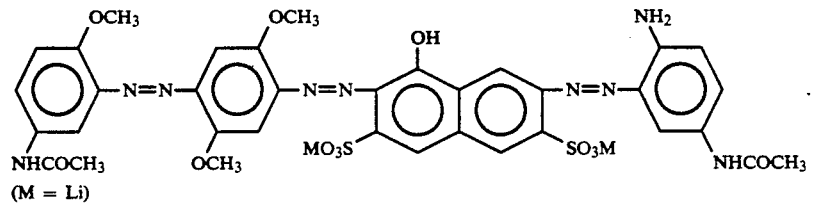

No.12

(M = Li)

10. In the ink-jet recording method of claim 8, wherein pH of the ink is within the range of from 4 to 10.

11. In the ink-jet recording method of claim 8, wherein the compound represented by the general formula (A) is contained in an amount within the range of from 0.1 to 15% by weight of the total weight of the ink.

12. In the ink-jet recording method of claim 8, wherein the ink further comprises a mixed solvent of water and a water-soluble organic solvent.

13. In the ink-jet recording method of claim 12, wherein the water is contained in an amount within the range of from 10 to 97.5% by weight of the total weight of the ink.

14. In the ink-jet recording method of claim 12, wherein the water-soluble organic solvent is contained in an amount within the range of from 2 to 80% of the total weight of the ink.

15. In the ink-jet recording method of claim 8, wherein the recording medium is non-coated paper or coated paper.

16. In the ink-jet recording method of claim 8, wherein the ink is ejected by action of thermal energy on the ink.

17. A recording unit having an ink container portion for holding an ink and a head for ejecting the ink in droplets, said ink being a liquid composition containing at least one compound represented by the general formula (A)

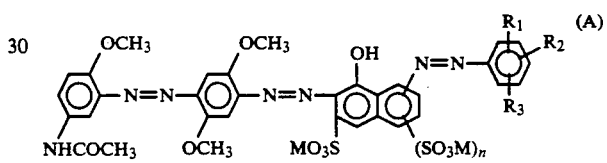

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

18. The recording unit of claim 17, wherein the compound represented by the general formula (A) is at least one selected from the following compounds of from No. 1 to No. 12:

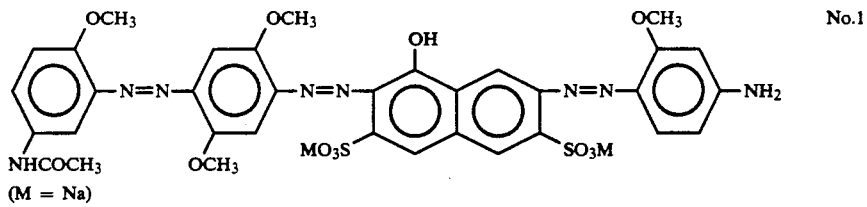

No.1

(M = Na)

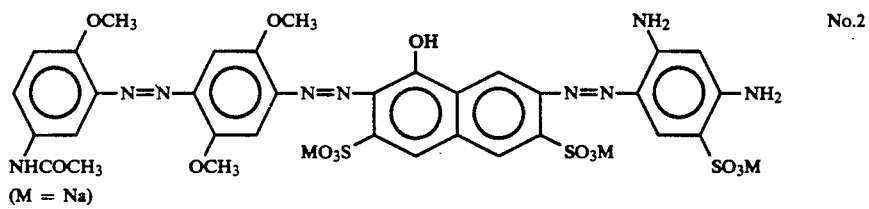

No.2

(M = Na)

-continued
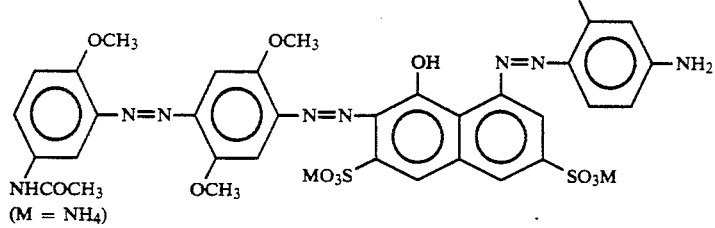
(M = NH₄)
No.3
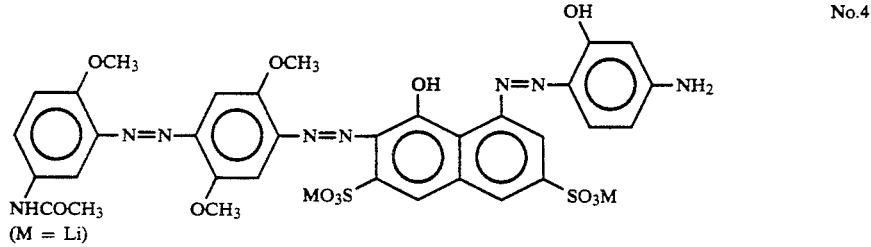
(M = Li)
No.4
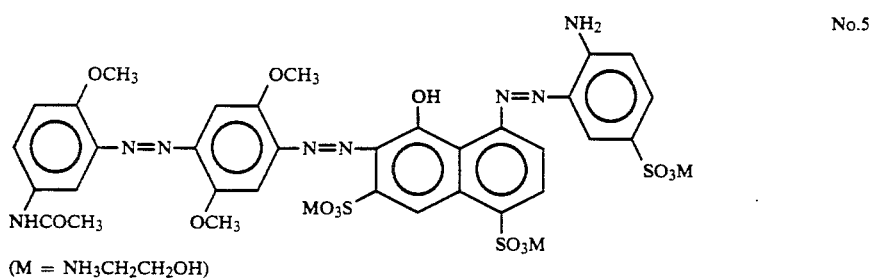
(M = NH₃CH₂CH₂OH)
No.5
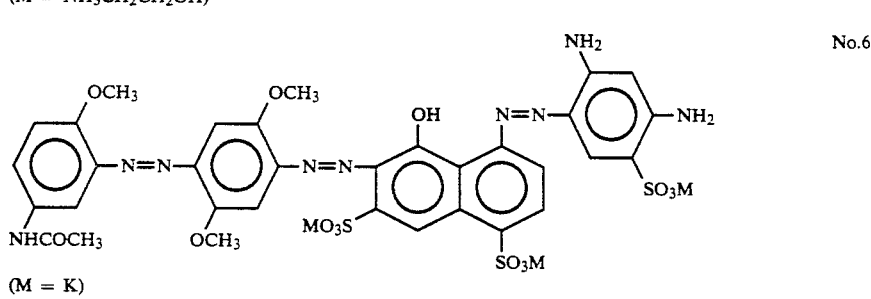
(M = K)
No.6
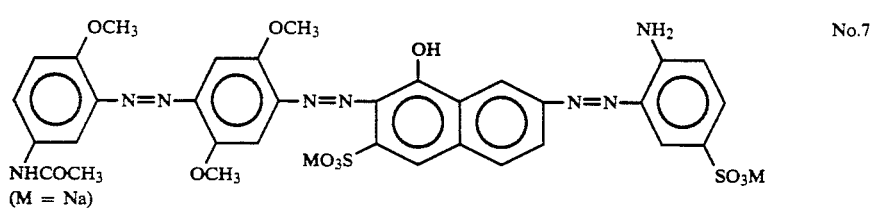
(M = Na)
No.7
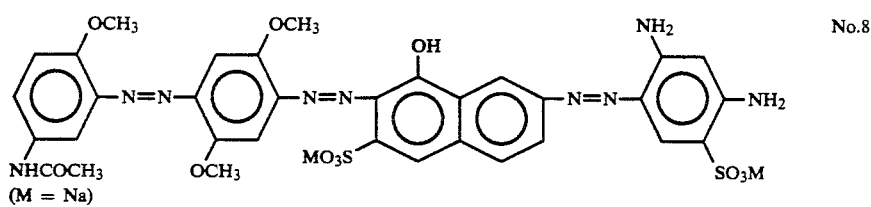
(M = Na)
No.8
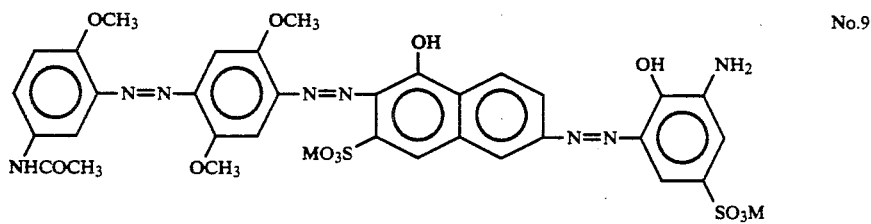
No.9

(M = Li)

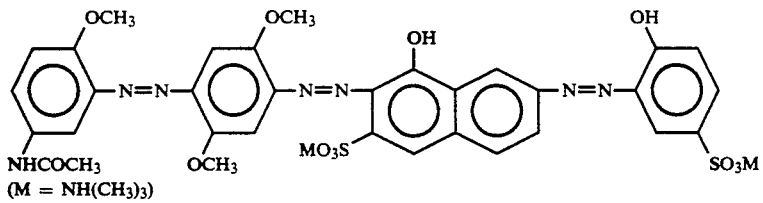
No.10

(M = NH(CH₃)₃)

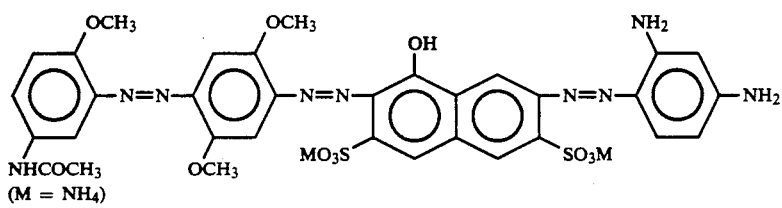
No.11

(M = NH₄)

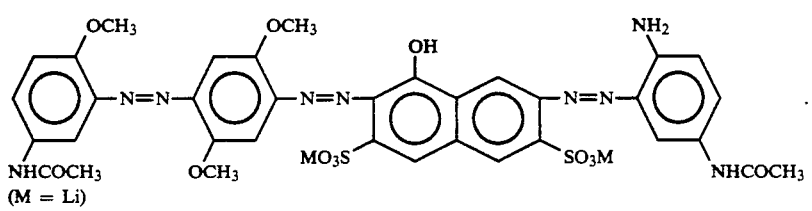
No.12

(M = Li)

19. The recording unit of claim 17, wherein pH of the ink is within the range of from 4 to 10.

20. The recording unit of claim 17, wherein the compound represented by the general formula (A) is contained in an amount within the range of from 0.1 to 15% by weight of the total weight of the ink.

21. The recording unit of claim 17, wherein the ink further comprises a mixed solvent of water and a water-soluble organic solvent.

22. The recording unit of claim 21, wherein the water is contained in an amount within the range of from 10 to 97.5% by weight of the total weight of the ink.

23. The recording unit of claim 21, wherein the water-soluble organic solvent is contained in an amount within the range of from 2 to 80% of the total weight of the ink.

24. The recording unit of claim 17, wherein the head ejects ink droplets by action of thermal energy on the ink.

25. The recording unit of claim 17, wherein the ink container portion comprises an ink absorption member.

26. The recording unit of claim 25, wherein the ink absorption member is formed from polyurethane.

27. An ink cartridge having an ink container portion for holding an ink, said ink being a liquid composition containing at least one compound represented by the general formula (A)

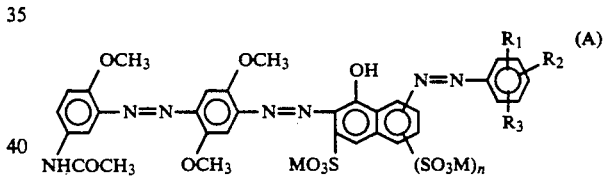

where n is 0 or 1; $R_1$, $R_2$, and $R_3$ are respectively a substituent selected from the group consisting of hydrogen, methyl, methoxy, hydroxy, amino, acetylamino, and sulfonic acid; and M is an alkali metal, ammonium, or an organic ammonium.

28. The ink cartridge of claim 27, wherein the compound represented by the general formula (A) is at least one selected from the following compounds of from No. 1 to No. 12:

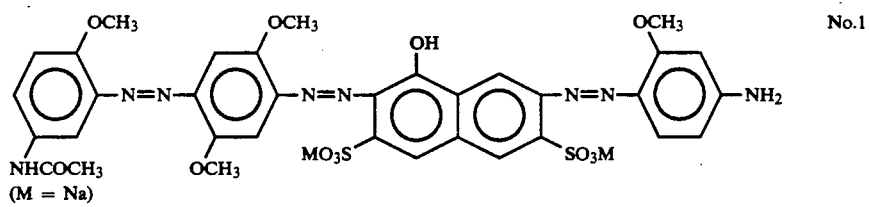
No.1

(M = Na)

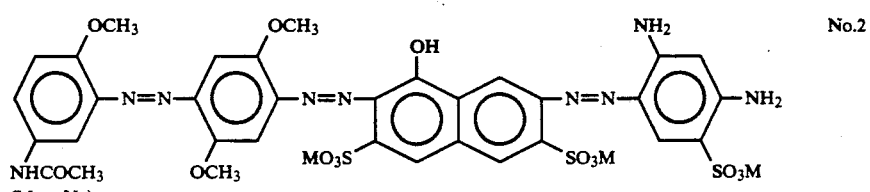
No.2

(M = Na)

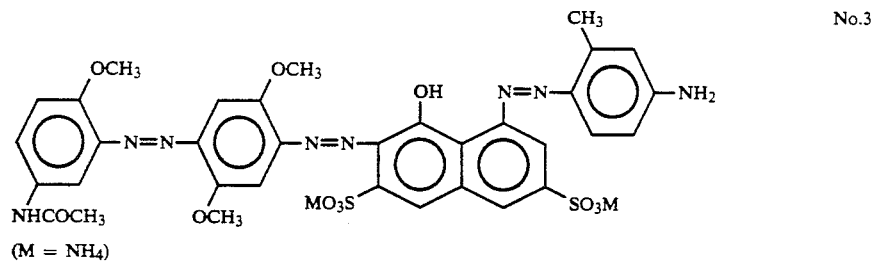
No.3
(M = NH₄)
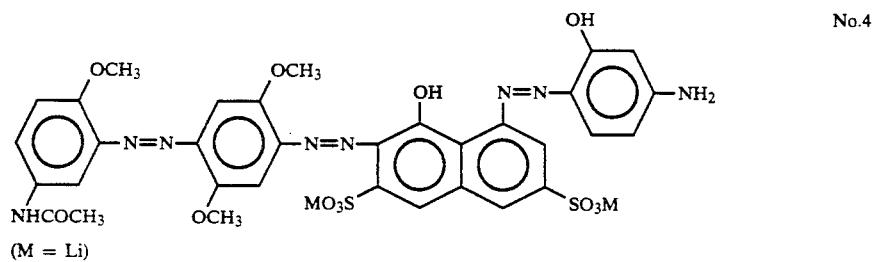
No.4
(M = Li)
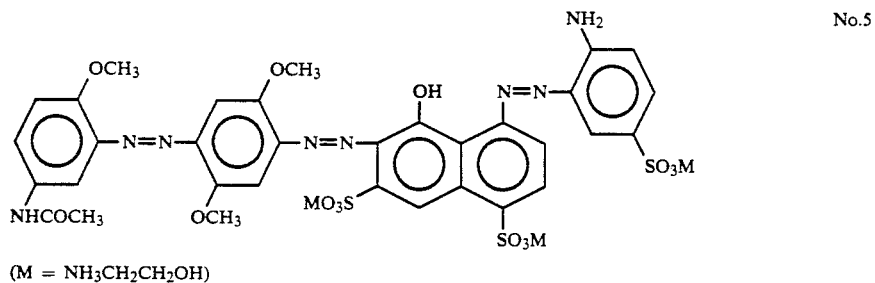
No.5
(M = NH₃CH₂CH₂OH)
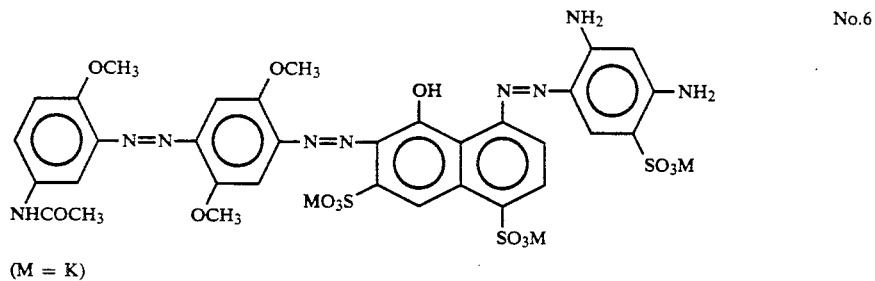
No.6
(M = K)
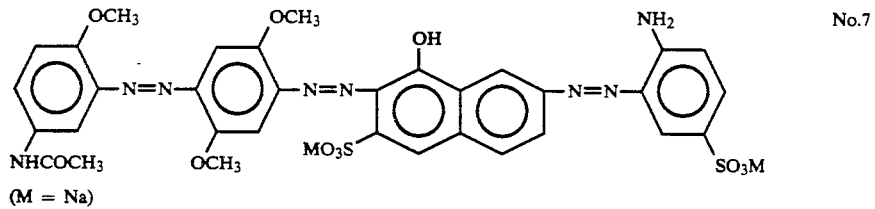
No.7
(M = Na)
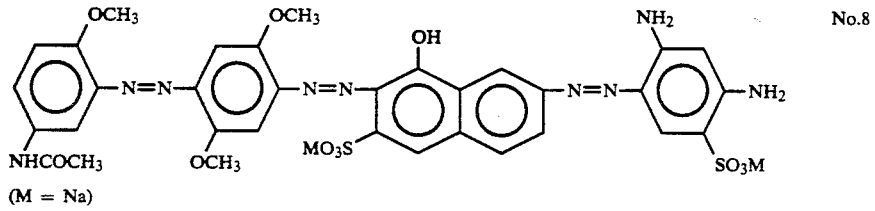
No.8
(M = Na)

-continued

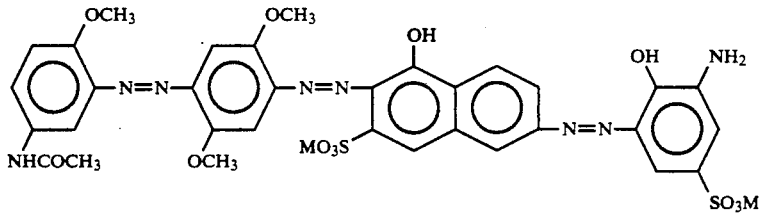
No.9

(M = Li)

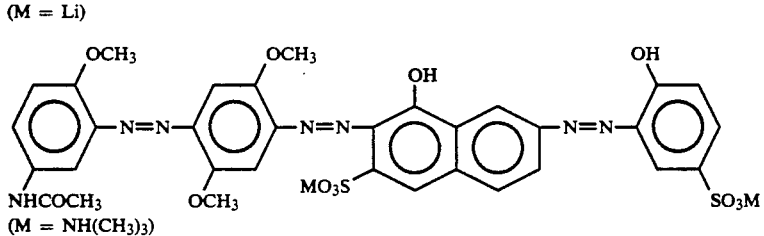
No.10

(M = NH(CH₃)₃)

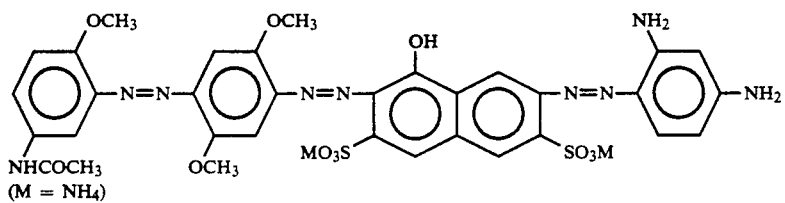
No.11

(M = NH₄)

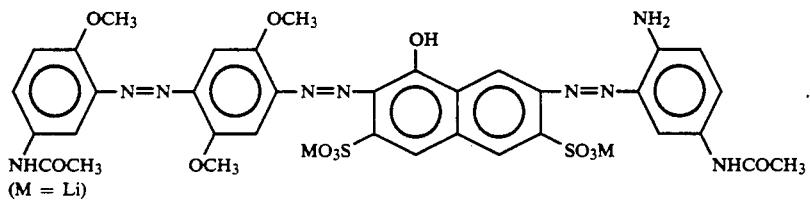
No.12

(M = Li)

29. The ink cartridge of claim 27, wherein pH of the ink is within the range of from 4 to 10.

30. The ink cartridge of claim 27, wherein the compound represented by the general formula (A) is contained in an amount within the range of from 0.1 to 15% by weight of the total weight of the ink.

31. The ink cartridge of claim 27, wherein the ink further comprises a mixed solvent of water and a water-soluble organic solvent.

32. The ink cartridge of claim 31, wherein the water is contained in an amount within the range of from 10 to 97.5% by weight of the total weight of the ink.

33. The ink cartridge of claim 31, wherein the water-soluble organic solvent is contained in an amount within the range of from 2 to 80% of the total weight of the ink.

34. The ink cartridge of claim 27, wherein the ink container portion is of a bag structure.

35. The ink cartridge of claim 27, wherein the ink container portion has a liquid-contact face formed of polyolefin.

* * * * *

UNITED STATES PATENT AND TRADEMARK OFFICE
CERTIFICATE OF CORRECTION

PATENT NO. : 5,127,946   Page 1 of 2
DATED : July 7, 1992
INVENTOR(S) : Eida et al.

It is certified that error appears in the above-identified patent and that said Letters Patent is hereby corrected as shown below:

COLUMN 7:

Line 41, "range" should read --pH range--.

COLUMN 9:

Line 29, "is" should read --are--.

COLUMN 11:

Line 24, "base" should read --based--.

COLUMN 23:

Line 37, "80%" should read --80% by weight--.

COLUMN 27:

Line 43, "80%" should read --80% by weight--.

UNITED STATES PATENT AND TRADEMARK OFFICE
CERTIFICATE OF CORRECTION

PATENT NO. : 5,127,946

DATED : July 7, 1992

INVENTOR(S) : Eida et al.

It is certified that error appears in the above-identified patent and that said Letters Patent is hereby corrected as shown below:

COLUMN 32:

Line 42, "80%" should read --80% by weight--.

Signed and Sealed this

Twelfth Day of October, 1993

Attest:

BRUCE LEHMAN

Attesting Officer

Commissioner of Patents and Trademarks